No. 786,476. PATENTED APR. 4, 1905.
W. ALLES.
MACHINE FOR MAKING SHEET GLASS.
APPLICATION FILED SEPT. 1, 1904.

5 SHEETS—SHEET 1.

WITNESSES:

INVENTOR.
William Alles
BY Thomas L. Ryan
ATTORNEY.

No. 786,476. PATENTED APR. 4, 1905.
W. ALLES.
MACHINE FOR MAKING SHEET GLASS.
APPLICATION FILED SEPT. 1, 1904.
5 SHEETS—SHEET 2.
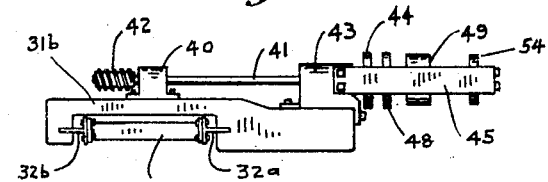
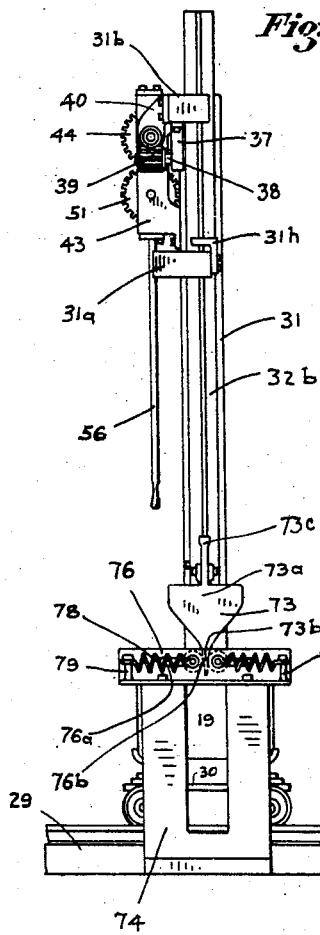
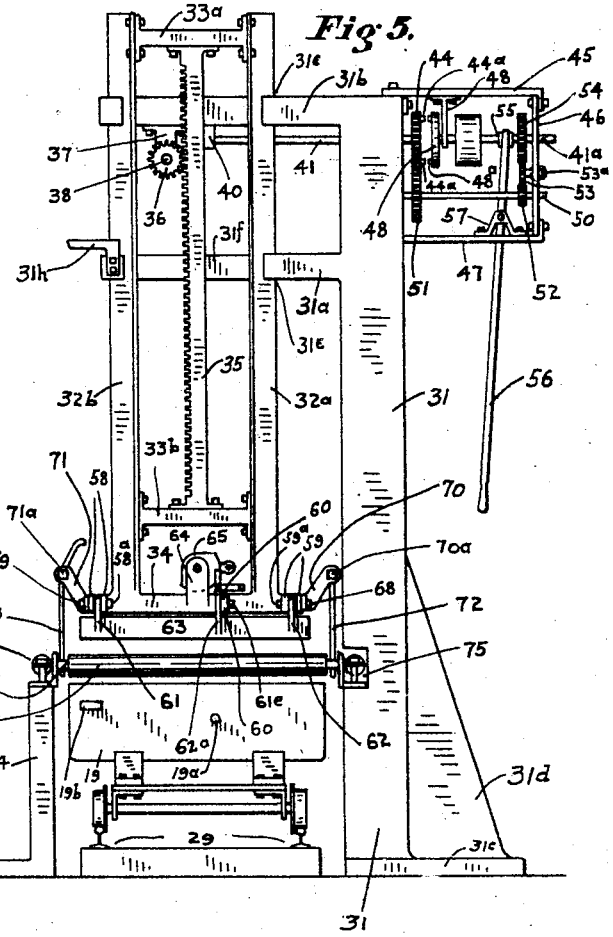

No. 786,476. PATENTED APR. 4, 1905.
W. ALLES.
MACHINE FOR MAKING SHEET GLASS.
APPLICATION FILED SEPT. 1, 1904.
5 SHEETS—SHEET 3.
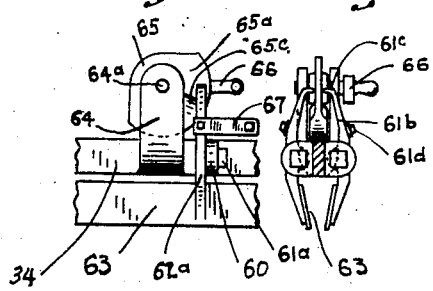
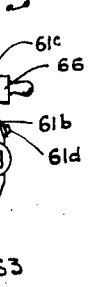
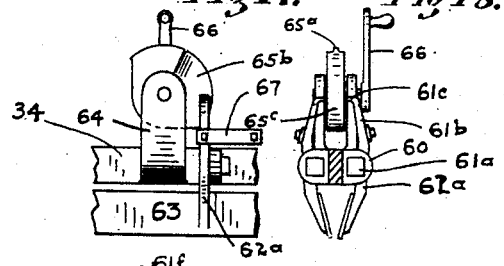
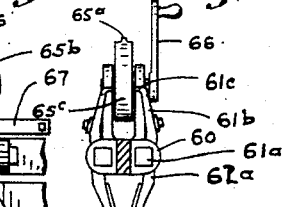
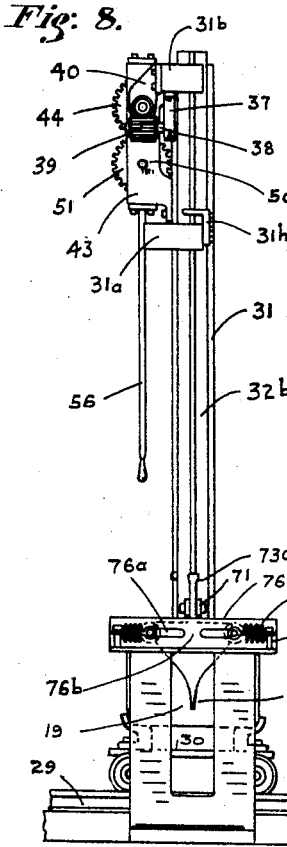
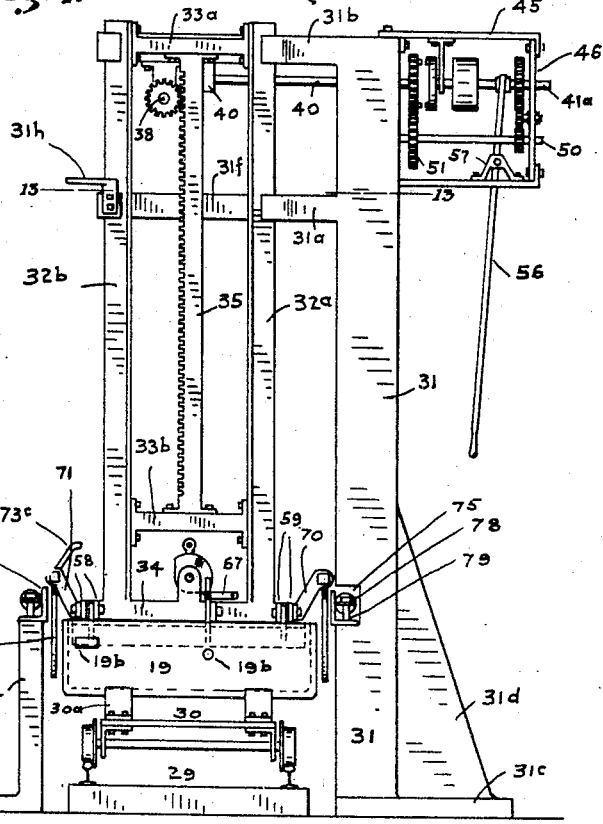
WITNESSES:
J F Crouch
R E Goedski
INVENTOR.
William Alles,
BY Thomas L. Ryan
ATTORNEY.

No. 786,476. PATENTED APR. 4, 1905.
W. ALLES.
MACHINE FOR MAKING SHEET GLASS.
APPLICATION FILED SEPT. 1, 1904.

5 SHEETS—SHEET 4.

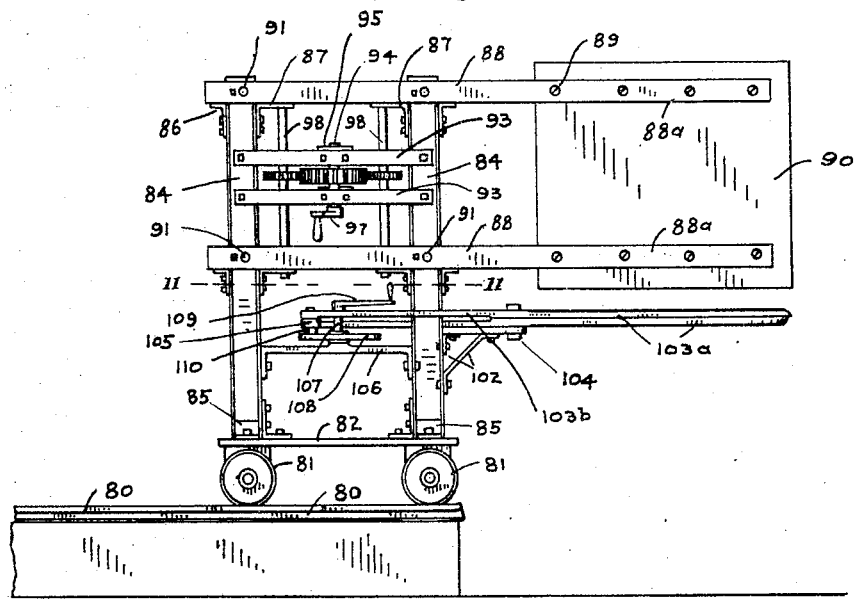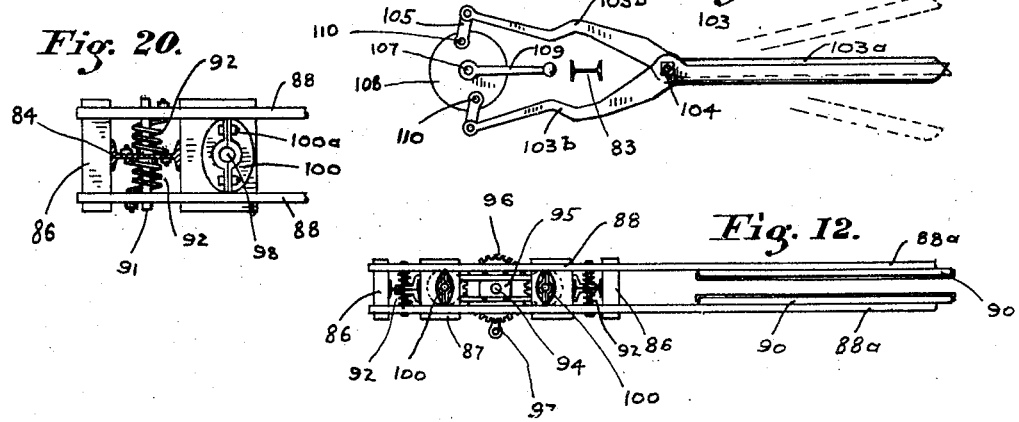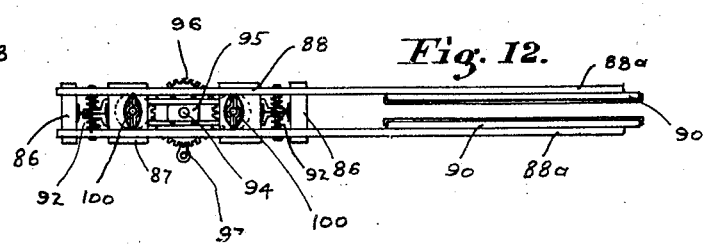

No. 786,476. Patented April 4, 1905.

UNITED STATES PATENT OFFICE.

WILLIAM ALLES, OF MUNCIE, INDIANA.

MACHINE FOR MAKING SHEET-GLASS.

SPECIFICATION forming part of Letters Patent No. 786,476, dated April 4, 1905.

Application filed September 1, 1904. Serial No. 222,994.

*To all whom it may concern:*

Be it known that I, WILLIAM ALLES, of Muncie, county of Delaware, and State of Indiana, have invented a certain new and useful Machine for Making Sheet-Glass; and I declare the following to be a full, clear, and exact description thereof, reference being had to the accompanying drawings, in which similar letters and figures of reference refer to corresponding parts throughout the several views.

The object of this invention is to construct a practical apparatus for the manufacture of sheet-glass, such as window-glass, by mechanical means and without blowing, and to dispense to a certain extent with the services of skilled workmen, as is now necessarily employed in the manufacture of sheet-glass.

The features of this invention consist of a gathering mechanism by means of which the molten glass is extracted from the furnace or tank preparatory to the forming of the sheet, a reciprocating carrier upon which is mounted a grasping mechanism by means of which the molten glass is drawn or stretched into the form of a sheet, a pair of adjustably-mounted rolls, and a shearing and conveying mechanism by means of which the sheet of glass is severed from the supply thereof and conveyed away from the forming mechanism.

In addition to the foregoing features of invention are the improvements in the details of construction and the peculiar combination and construction and arrangement of parts, all of which are shown in the accompanying drawings and in the following description and claims.

Figure 1:
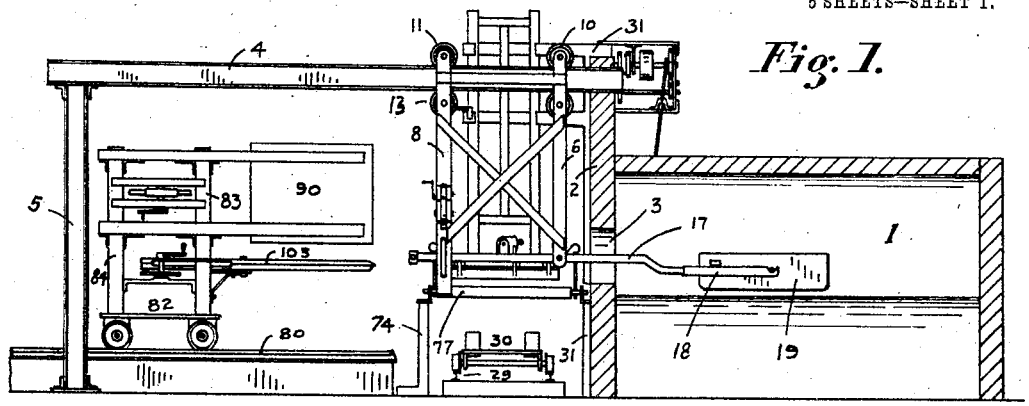
Figures 2, 3, 4, 19:
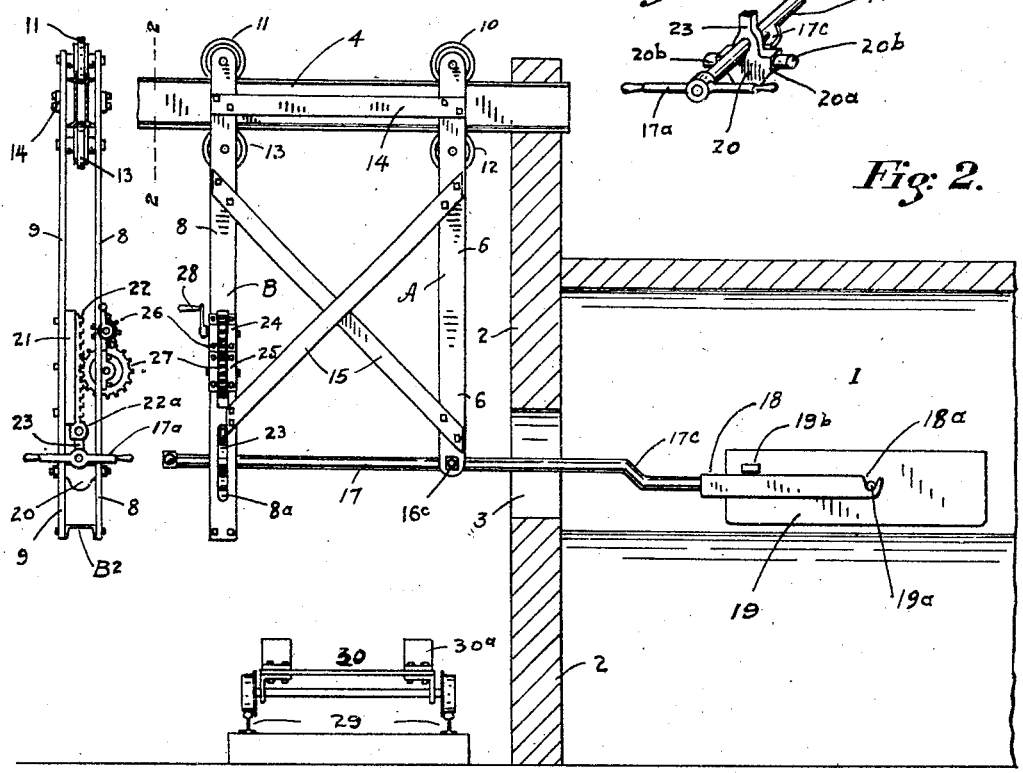
Figure 9:
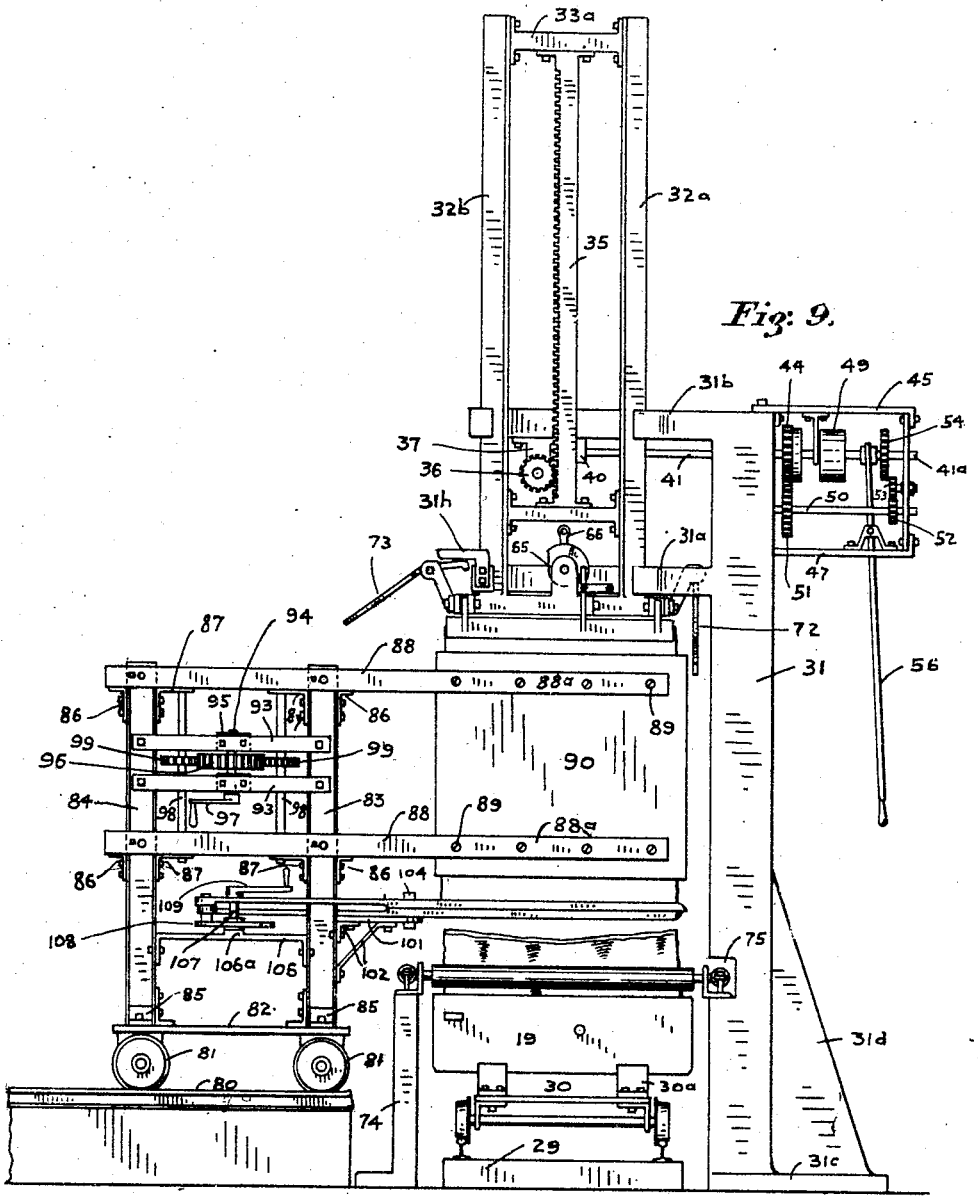

In the drawings, Figure 1 is a vertical longitudinal section of a tank in which is retained the molten glass from which the sheets are formed and the gathering mechanism and framework upon which it is operated and supported, in elevation, also the forming mechanism and the shearing and conveying mechanism in elevation. Fig. 2 is an enlarged view of Fig. 1, showing a part of the tank and a part of the framework broken away and the forming mechanism and shearing and conveying mechanisms removed. Fig. 3 is a detached enlarged view of the device for sustaining the draw-bar in position. Fig. 4 is a vertical cross-section on the line 2 2, Fig. 2. Fig. 5 is a side view of the sheet-forming mechanism with all its parts in normal position. Fig. 6 is a front view of Fig. 5. Fig. 7 is a side view of the sheet-forming mechanism, showing the grapple in lowermost position, the gathering-pan laden with molten glass underneath the grapple, the jaws of the grapple in open position and into the molten glass, the gage-rolls in maximum outward position, one gage-roll being removed. Fig. 8 is a front view of Fig. 7. Fig. 9 is a side view of the sheet-forming mechanism, showing the grapple in uppermost position, the gathering-pan underneath the grapple, the jaws of the grapple in closed position and clasping the upper end of a sheet of glass, the gage-rolls in maximum inward position, between which rolls the glass has been drawn, the shears in closed position, having performed the operation of shearing off the lower end of the sheet, and the conveying and shearing mechanism in readiness for removing the sheet, the same having been severed and clamped and the grapple-jaws returned to their open position. Fig. 10 is a detached side view of the shearing and conveying mechanism, showing the shears in closed position and the clamps for the sheet of glass in open position. Fig. 11 is a top plan on the line 11 11, Fig. 10, showing lower parts of the mechanism removed. Fig. 12 is a top plan view of Fig. 10, showing lower parts of the mechanism removed. Fig. 13 is a horizontal cross-section on the line 13 13, Fig. 7. Fig. 14 is a top plan view of Fig. 5. Fig. 15 is a detached enlarged side view of a portion of the grapple in its open position, as shown in Fig. 5. Fig. 16 is a cross-section of Fig. 15. Fig. 17 is a detached enlarged side view of a portion of the grapple in its closed position, as shown in Fig. 7 and Fig. 9. Fig. 18 is a cross-section of Fig. 17. Fig. 19 is a detached enlarged view of the collar at the lower end of suspender A, Fig. 2. Fig. 20 is a detached enlarged view of the closing device for clamp-beams, Fig. 12.

1 designates a tank or retort in which is prepared and retained the molten glass to be operated upon. 2 designates the front wall of the same provided with the opening 3, through which is operated inwardly and outwardly the gathering means. Located in front of the tank-wall 2 and extending away from the same in a direction at right angles to the wall is the horizontal girder 4. This girder is composed of two channel-bars suitably secured together longitudinally and parallel to each other a uniform distance apart throughout their length, providing an unobstructed and continuous space between the upper and lower edges of the same for the purpose hereinafter shown, and is supported at its inner end upon the wall of the tank and at its outer end upon the suitable post 5.

Rollably positioned upon and supported by the girder 4 are the suspenders A and B, composed of the pairs of parallel bars 6 and 7, 8 and 9, respectively. Pivotally secured to the upper ends of the suspenders and between the bars of each A and B, respectively, are the wheels 10, 11, 12, and 13. These wheels are provided each with a central flange adapted to fit loosely within the space between the inner upper and lower edges of the channel-bars of the girder upon which the gathering means is supported. Each of these wheels is provided with a transversely-extending shaft with shoulders thereon adapted to maintain at a given distance apart the suspender-bars 6 7 and 8 9, so that the suspenders A and B will be free to move loosely along the outer edges of the girder 4, thereby forming a guide for the same.

$B^2$ designates a separator provided at the lower end of the suspender B, adapted to sustain in rigid position apart the bars 8 and 9.

It will be observed that the wheels 12 and 13 are so positioned that their peripheries are free to bear upwardly against the lower faces of the girder, by means of which longitudinal or transverse vibration or tipping of the gathering means is prevented.

The suspenders A and B are rigidly maintained in their positions each from the other by means of the longitudinal strut 14 and the diagonal braces 15, arranged alike on each side of the suspenders and suitably secured by bolts, as plainly shown in Fig. 2. These members 14 and 15 also tend to stiffen and brace the suspenders and together with the same compose the frame by which the gathering means is supported and from which it is operated.

16 designates a collar provided with the transversely-extending shoulders $16^a$ and the journals $16^b$ with the nuts $16^c$ thereon, all so adapted that the collar is pivotally horizontally supported, and the suspender-bars 6 and 7 are maintained in accurate separated position. Slidingly and rotatably positioned in the collar 16 is the draw-bar 17, having the inwardly-extending portion provided with the crook $17^c$, the function of which is to facilitate the inserting of the gathering-pan into the molten glass at the varying levels of the same ordinarily assumed. The inwardly-extending end of this draw-bar is provided with the U-shaped prong 18, the outward ends of the arms of same having the apertures $18^a$, adapted to receive the studs $19^a$, formed integrally on each side of the gathering-pan 19. As will be plainly seen in Fig. 2, the studs $19^a$ are positioned slightly above and in front of the center of the sides of the gathering-pan, so that when the same is loaded with the molten glass the rearward part of the pan will have a tendency to fall. By means of the lugs $19^b$, formed integrally with and positioned above the center and toward the rearward part of the pan, so that when the gathering-pan is in a substantially horizontal position the lugs will bear against the upper edges of the arms 18, the pan will be maintained in such position. Rigidly secured to the outward end of the draw-bar 17 is the transversely-extending handle-bar $17^a$, by means of which the gathering-pan may be rotatably tilted by the operative when a charge of glass is to be obtained.

$8^a$ and $9^a$ designate oppositely-positioned vertically-extending slots in the suspender B. The cross-head 20 is provided with the transversely-extending shoulders $20^a$ and the journals $20^b$, adapted to bear slidingly against the inner sides of the suspender-bars 8 and 9 and within the slots $8^a$ and $9^a$. Rigidly secured to the inner side of the suspender-bar 9 is the vertically-extending guide-bar 21, in which is slidingly secured the rack 22, to the lower end $22^a$ of which is pivotally secured, by means of the movably-secured link 23, the cross-head 20. The link 23 is formed integrally with the cross-head 20, the lower portion of which is provided with suitable opening through which passes slidingly and rotatably the outer end of the draw-bar, as plainly shown in Fig. 3 and Fig. 4. The draw-bar 17 is provided with the outwardly and longitudinally extending tongue $17^c$, which in normal position rests upon the upper surface of the shoulder $20^a$ of the cross-head 20 and the function of which is to prevent the rotation backwardly of the gathering-pan when same is returned with a charge of glass from its necessarily tilted position. A further function of the tongue $17^c$ is to afford a rest or support by which the position of the gathering-pan in reference to the carrier-frame may be by the operative steadied. Journaled in the pillow-blocks 24 and 25, which are rigidly secured to the outer surface of the bar 8 of the suspender B, meshing each in the other, and the wheel 27, meshing with the rack 22, are the cog-wheels 26 and 27. Rigidly secured to the transverse shaft of the cog-wheel 24 is the crank 28, by means of which when the wheel 24 by the operative is rotated the wheel 27 is revolved and the rack 22, the draw-bar, and gathering-pan are moved upwardly or downwardly, as may be desired.

29 designates a track extending at right angles with the front of the tank and adapted to form a runway for the truck 30, provided with the suitably-shaped blocks 30$^a$, adapted to receive and sustain while the same is being conveyed from the tank the gathering-pan with its charge of molten glass. This track extends away from the tank, and adjacent to the same is positioned the sheet-forming mechanism hereinafter described, as shown in Fig. 1, Fig. 5, Fig. 7, and Fig. 9.

In juxtaposition to the gathering mechanism, as plainly shown in Fig. 1, is the sheet-forming mechanism illustrated in Figs. 5, 6, 7, 8, 9, 14, 15, 16, 17, and 18. The pilaster 31, with the base 31$^c$, the stiffening-web 31$^d$, and the forwardly-extending horizontal arms 31$^a$ and 31$^b$, forming the upper portion thereof, constitute the frame for the same. Slidingly secured in the guides 31$^e$ of the arms 31$^a$ and 31$^b$ and adapted to reciprocate vertically therein is the carrier-frame. This carrier-frame consists of two T-shaped bars 32$^a$ and 32$^b$, positioned vertically parallel and apart, as shown, and connected rigidly in position each to the other by means of the struts 33$^a$ and 33$^b$. Formed integrally thereto at the lower end of the bars 32$^a$ and 32$^b$ is the transversely-extending bar 34, adapted to sustain the grapple hereinafter described. Rigidly secured at its upper and lower ends to the struts 33$^a$ and 33$^b$ between, parallel to, and equidistant from the T-bars of the carrier-frame is the rack 35, which meshes with the pinion 36. On the under side of the arm 31$^b$ is rigidly secured the downwardly-extending pillow-block 37, in which is journaled the transversely-extending shaft 38, upon the one end of which is rigidly secured the pinion 36 and upon the opposite end of which is rigidly secured the cog-wheel. Rigidly secured to the outward side of the arm 31$^b$ is the downwardly-extending pillow-block 40, in which is journaled the horizontal shaft 41, extending in a line at right angles with the shaft 38. On one end of the shaft 41 and adapted to mesh with the cog-wheel 39 is rigidly secured the worm 42. The opposite end of this shaft is journaled in the pillow-block 43 and has secured thereto the gear-wheel 44, provided with the two outwardly-extending lugs 44$^a$. Rigidly secured to the pillow-block 43 and to each other are the plates 45, 46, and 47, which constitute a frame for the support of the mechanism provided for reversing the motion of the shaft 41. Supported by the plate 45 is the rigidly-secured downwardly-extending pillow-block 48, in which is journaled one end of the shaft 41$^a$, the opposite end of which shaft is journaled in the plate 46. The shaft 41$^a$ is in alinement with the shaft 41, and rigidly secured to the end of the same, directly opposite the gear-wheel 44, is the disk 48, provided on its outer face with the outwardly-extending lugs 48$^a$, so adapted that when the shaft 41$^a$ is shifted toward the shaft 41 the lugs 48$^a$ will engage the lugs 44$^a$, thereby locking the wheel 44 and the disk 48 rigidly together and causing the shaft 41 to revolve in the same direction as the revolution of the shaft 41$^a$. Mounted on the shaft 41$^a$ is the pulley 49, through which is imparted the motion necessary for the operation of the carrier-frame of the sheet-forming mechanism. Positioned parallel to and below the shaft 41$^a$ is the shaft 50, journaled at its ends in the pillow-block 43 and in the plate 46. Rigidly secured to the shaft 50 and in engagement with the gear-wheel 44 is the gear-wheel 51. On the opposite end of the shaft 50 is rigidly secured the gear-wheel 52, which meshes with the idler 53, which idler is rotatably secured to the stud 53$^a$ and which idler in turn meshes with the gear-wheel 54, which is rigidly secured to the shaft 41$^a$.

55 designates a collar provided with annular groove and mounted upon the shaft 41$^a$, to which collar is loosely connected by suitable means the downwardly-extending lever 56, pivotally supported at the standard 57 upon the frame-plate 47 and so adapted that by the shifting of the same by the operative forward or backward the direction of the movement of the carrier-frame may be regulated and controlled at any stage of the progress upwardly or downwardly of the same. It will be seen from Figs. 5, 7, and 9 that when the lever 56 is shifted by the operative the shaft 41$^a$ is moved transversely in the journals of the pillow-block 43 and the plate 46, whereby the face of the disk 48 meets the face of the gear-wheel 44, the lugs 44$^a$ and 48$^a$ are engaged, and the shaft 41 is then revolved in the same direction with the revolution of the shaft 41$^a$. By a reverse shift of the lever 56 the lugs are disengaged simultaneously with the engagement by the gear-wheel 54 with the idler 53 and gear 52, by which operation the direction of the revolution of the shaft 41 is reversed. By this means and by means of the worm, pinion, and rack the change of the movement of the carrier-frame upwardly or downwardly, as may be desired, is obtained quickly, and the movement of the carrier-frame during its travel will be steady and without vibration.

The arm 31$^a$ is formed with the outwardly-projected central portion 31$^f$, as shown in Fig. 13, and with the aperture 31$^g$, the functions of which will be hereinafter shown. Rigidly secured to the extreme outward end of the arm 31$^a$ is the trip 31$^h$, the function of which will be hereinafter described.

In the carrier-frame extending outwardly on both sides of the bar 34 are the lugs 58, 59, and 60. Pivotally secured to these lugs 58 and 59 by means of the bolts 58$^a$ and 59$^a$, as plainly shown in Figs. 5, 7, and 9, are the hinge-bars 61 and 62 of the grapple-jaws 63, by means of which the grapple-jaws are free to move inwardly and outwardly, thus lessening or increasing the width of the space between the lower edges of the same. Pivotally secured to the lugs 60 by means of the bolts 61$^e$ are the hinge-bars 62$^a$, provided with the upwardly-extending fingers 61$^b$, having the noses 61$^c$, as plainly shown in Figs. 15, 16, 17, and 18.

Formed integrally with the bar 34 are the standards 64, positioned apart, as shown in Figs. 16 and 18, between which standards is supported pivotally the transversely-extending shaft 64$^a$, to which shaft is rigidly secured the quadrant 65, having the normal portion 65$^a$ connected by the oppositely-positioned inclined planes 65$^c$ to the thickened portion 65$^b$. Secured rigidly to the end of the shaft 64$^a$ is the crank 66. The grapple-jaws when in normal position are sustained with the jaw-bars 63 apart, as shown in Fig. 16, by means of the strong leaf-spring 67, the ends of which are secured to the fingers 61$^b$ by means of the bolts 61$^d$. When it is desired to close the grapple-jaws, the quadrant is rotated by the operative by the crank 66, the leaf-spring 67 is strained, the fingers 61$^b$ are forced apart by the inclined planes 65$^c$, and are sustained apart by the thickened portion 65$^b$ of the quadrant.

Rigidly secured to the outer faces of the lugs 58 and 59 by means of the bolts 68 and 69 are the upwardly and outwardly extending arms 70 and 71, so positioned that the heads of the same provided with the bolts 70$^a$ and 71$^a$ are maintained a predetermined distance apart. Depending from the bolts 70$^a$ and 71$^a$ are the vertically downwardly extending tapered flat separators 72 and 73, the edges of which slope symmetrically inwardly toward each other from the maximum width of the same at their top portions 73$^a$ in reverse curves to the minimum width of the same at their bottom portions 73$^b$ and are so adapted that when the parts of the sheet-forming mechanism are in normal position the portions 73$^b$ of the separators rest between the bearing ends of the gage-rolls, hereinafter described.

73$^c$ designates an upwardly and inwardly extending arm integral with the separator 73, so adapted that when the carrier-frame is in its uppermost position the arm 73$^c$ is in engagement with the trip 31$^h$, and the separator is swung outwardly to permit of the passing under the same of the shearing and conveying mechanism.

Positioned at proper distance in front of the pilaster 31 is the standard 74, secured in rigid position by suitable means. Oppositely positioned and rigidly secured in the notch 75 of the pilaster 31 and also upon the standard 74 are the angle-shaped transversely-extending guide-bars 76. These guide-bars are provided each in their upwardly-extending legs with the longitudinal horizontal slots 76$^a$, the slots being separated at their inner ends by the portion 76$^b$ of the leg and adapted to retain and guide inwardly and outwardly the bearing ends of the gage-rolls, hereinafter described.

Positioned below the carrier-frame, parallel to the grapple and parallel to each other, are the polished cylindrical rolls 77, provided at their ends with the journals 77$^a$, which are of such length that sufficient space is afforded between the ends of the rolls and the faces of the guide-bars 76 to permit of the passing of the separators 72 and 73 and that they project through and beyond and rest within the slots 76$^a$. Secured to the outer ends of each of the journals 77$^a$ by suitable means are the strong coiled springs 78, the opposite ends of each of which springs are rigidly secured to the studs 79, which studs are rigidly secured to the outer ends of the guide-bars 75. These springs are so adapted that they normally force inwardly and toward each other uniformly. The rolls 77 are uniformly strained outwardly when the separators 72 and 73 descend between the journals 77$^a$.

80 designates a track extending up to and on a line at a right angle to the track 30 and the sheet-forming mechanism, which track 80 is adapted to form a runway for the shearing and conveying mechanism mounted on the wheels 81 and the platform 82. Extending upwardly from the central portion of the platform 82 are the I-beam uprights 83 and 84, securely held in position by the angle-plates 85 or other suitable means. Rigidly secured transversely to the outer faces of the flanges of the uprights, as plainly shown in Figs. 9 and 10, are the angle-plate supports 86, and upon the inner flanges of the uprights are rigidly secured transversely the angle-plate supports 87. Resting movably upon the supports 86 and 87 are positioned horizontally and longitudinally with the platform 82 and parallel to each other and upon either side of the uprights 83 and 84 the two pairs, one above the other, of the beams 88, each rectangular in cross-section. Rigidly secured to the forwardly-extending ends 88$^a$ of each pair of the beams by means of the screws 89 are the clamps 90. The clamps are composed of slabs made of suitable material, and their inner or facing surfaces are covered with a uniform coating of asbestos or other ductile material secured to the outer and rearward edges of the slabs, so that the faces of the clamps will be smooth.

Passing transversely through the uprights 83 and 84 and rigidly secured thereto are the guide-shafts 91, the outer ends of which pass through and retain movably in position slidingly on the supports 86 and 87 the beams 88. Surrounding the guide-shafts 91 and on both sides of the uprights, one end of each rigidly secured to the uprights and the other end of each rigidly secured to the inner faces of the beams 88, are the strong coiled springs 92, adapted to strain inwardly and toward each other uniformly the beams 88.

Rigidly secured to the uprights 83 and 84 and connecting the same are the pairs of longitudinally-extending horizontal struts, one pair above the other, 93. Positioned equidistant between the uprights is the vertical shaft 94, journaled in the pillow-blocks 95, upon which shaft, between the pillow-blocks, is rigidly secured the gear-wheel 96, and upon the lower end of which shaft is rigidly secured the crank 97. Sustained in the bearings provided in the horizontally-extending legs of the supports 87 are the vertically-extending shafts 98, provided with the gear-wheels 99, adapted to and meshing with the gear-wheel 96. Detachably secured to the shafts 98 by means of the bolts $100^a$ are the elliptical cams 100, adapted to force outwardly the beams 88, the inner faces of which are normally pressed firmly against the peripheries of the cams by means of the coiled springs 92, as plainly shown in Figs. 12 and 20. I provide detachable cams, as shown, so that the desired width of the space between the clamps may be obtained with facility. From the illustration and description shown it will be seen that by the rotation by the operative of the shaft 97 and the gear-wheel 96 the shafts 98 and the cams 100 are rotated, whereby the beams 88 and the clamps will be opened and closed inwardly and outwardly uniformly throughout their extent.

Upon the base 101, which is secured to the upright 83 by means of the support and the brace 102, are the shears 103, secured pivotally in position by means of the pin 104 and so positioned that the shear-blades extend forwardly and are adapted to be operated directly underneath the clamps 90. Extending rearwardly are the shanks $103^b$, each connecting pivotally at its end with the connecting-rods 105. Extending longitudinally between and connecting the uprights 83 and 84 is the horizontal strut 106, at the center of which is provided the bearing $106^a$. Rotatably secured in this bearing is the vertical shaft 107, upon the lower part of which shaft is secured horizontally the disk 108, and upon the upper end of which shaft is rigidly secured the crank 109. Upon the upper face of the disk 108 at predetermined locations are the studs 110, to which are pivotally connected the connecting-rods 105. It will be plainly seen that by the rotation by the operative of the disk 108 the shears will be operated, the blades being moved inwardly and outwardly to such extent, and slowly or speedily, as may be necessary in the operation and use of the apparatus.

It is not claimed that in the operation of this apparatus sheet-glass can be formed by simply mechanical means nor by a machine which might be devised to work automatically in all its parts. Owing to the peculiar character and nature of molten glass and the extremely variable consistency of same, the manufacture of same has always required the services of skilled workmen exclusively. In the use of the apparatus described the need of skilled operatives is reduced to a minimum and a far greater number of sheets of glass may be obtained by a given expenditure of time and labor than by any other known process.

In the operation of the apparatus the gathering-pan is projected by the operative, by means of the gathering mechanism, into the tank containing the molten glass. After the same has been so projected the crank 28 is then rotated, thereby lowering the gathering-pan through the necessary distance and into the molten glass the required depth for obtaining therein a proper charge. The draw-bar is then tilted transversely by means of the handle-bar $17^a$, whereby one side of the gathering-pan is lowered or dipped into the molten glass a proper depth and the charge of glass to be operated upon is obtained within the gathering-pan. The crank 28 is then rotated in reverse direction, thereby returning the draw-bar and gathering-pan to the proper level for its withdrawal from the tank. The operation of projecting the gathering-pan into the tank is then reversed, and the same is withdrawn from the tank and deposited on the truck 30, which has been by a second operative rolled into position in front of the tank on the track 29. The truck sustaining the gathering-pan with its charge of molten glass is then rolled along the track 29 into position underneath the carrier-frame and grapple of the sheet-forming mechanism, as plainly shown in Fig. 5. The sheet-forming mechanism is driven by outside means, preferably by an electric motor, by which the speed of the revolution of the pulley 49 may be more easily regulated as to slowness or rapidity. As shown in Fig. 5, the carrier-frame in normal position supports the grapple immediately above the gage-rolls, and the separators in their normal position are in readiness to commence the separation or pushing apart of the gage-rolls. Here the third and skilled operative applies the actuating power to the pulley 49. The worm 42, the gear 39, and the pinion 38 are revolved, and the rack and carrier-frame supporting the grapple are lowered simultaneously with the automatic separation of the gage-rolls by the separators. After the grapple has sunk the proper depth within the molten glass, simultaneously with the reversed movement of the carrier-frame, the quadrant is rotated, the thickened portion $65^c$ of the same forcing itself between the fingers $61^b$ of the grapple-jaws, straining the leaf-spring 67 and clasping in the wedge-shaped opening between them a portion of the molten glass. It will be observed that the grapple-jaws do not close completely, but stand apart at such width and angle that a grip on the glass is secured by which it may be drawn upward in a thin sheet the width equal to the length of the grapple-jaws. As the carrier-frame ascends slowly and steadily and under the control of the skilled operative the separators permit the strained springs 78 to force inwardly and to their proper position, regulating the thickness of the sheet, and fixed by the width of the wall $76^b$ of the guide-bars, the gage-rolls 77, which rolls, though revolving on their axes, resist the drawing of the molten but cooling glass by the grapple sufficiently to cause the glass to be stretched slightly as it passes between and free from the rolls, thereby giving to the sheet of glass thus in process of forming as the grapple ascends a luster or enamel. Skilful manipulation by the operative of the electric motor or other driving mechanism by which the speed of the same may be regulated will cause the grapple to move upwardly with such precision as to slowness or rapidity that the sheet being so formed may be drawn uniformly and to a nicety, thereby obtaining a uniform and regular thickness throughout its extent. Simultaneously with the completion of the ascent of the carrier-frame and the grapple and the throwing off of the power actuating the pulley 49 the arm $73^c$ of the separator has been actuated by the trip $31^h$, causing the separator to swing outwardly. The second operative then rolls the conveying and shearing mechanism into operative position along the track 80, as shown in Fig. 9. Crank 97 is then rotated, thereby closing each toward the other and against the surface of the glass sheet the clamps 90, the glass by this time having cooled sufficiently to be clasped in its upper portion. The crank 109 is then rotated and the shears are operated and the sheet of glass is severed from the molten glass, below which glass recedes into the gathering-pan to be remelted. After the sheet has been severed, as described, the crank 66 is then rotated, permitting the spring 67 to return the grapple-jaws to normal and open position, as shown in Fig. 16, and to release their grip on the upper end of the glass sheet. The shearing and conveying mechanism is then withdrawn from its operative position, and the glass sheet, still securely held by the clamps 90, is conveyed to suitable place where the same is discharged for the processes of tempering and trimming of the same in readiness for the market.

What I claim as my invention, and desire to secure by Letters Patent, is—

1. In a glass-making machine, a sheet-drawing device consisting of a pair of parallel bars movable toward and away from each other, a spring that tends to force said bars toward each other, and means acting against the spring for separating said bars as far as desired.

2. In a glass-making machine, a sheet-drawing device consisting of pairs of pivotally-mounted jaws with their adjacent faces arranged at an angle to each other, oppositely-placed bars secured to said jaws, the arrangement being such that the lower and outer edges of said bars will be closer to each other than the upper or inner edges, and means for controlling the distance between said bars.

3. In a glass-making machine, the combination with a sheet-drawing device, of means for holding and supporting said device which consists of a vertical stationary guideway, a frame vertically movable in said guideway to the lower end of which said sheet-drawing device is connected, said movable frame consisting of an upper and lower portion movable in said guideway, and an intermediate vertical rack-bar connected with the upper and lower portions, a gear-wheel meshing with said rack-bar, and means for driving said gear-wheel.

4. In a glass-making machine, a sheet-drawing device, vertically-movable frame for supporting and moving said sheet-drawing device, a truck movable into position under said vertically-movable frame, a gathering-pan, and means for placing said gathering-pan upon said truck so that when the gathering-pan is beneath said vertically-movable frame said sheet-drawing device may be moved downward into said gathering-pan.

5. In a glass-making machine, a sheet-drawing device, vertically-movable means for supporting and moving said sheet-drawing device, a pair of spring-pressed rollers between which said sheet-drawing device passes in the lower part of its movement, a gathering-pan for containing the molten glass, means for supporting said rollers immediately above said gathering-pan, and means for separating said rollers as the sheet-drawing device approaches the same in its downward movement.

6. In a glass-making machine, a sheet-drawing device, vertically-movable frame for supporting and moving said sheet-drawing mechanism, a pair of spring-pressed rollers between which said sheet-drawing device passes in the lower part of its movement, a gathering-pan for containing the molten glass, means for supporting said rollers immediately above the gathering-pan, means for separating said rollers as the sheet-drawing device approaches the same in its downward movement, and a trip on said vertically-movable frame for actuating said separating means.

7. In a glass-making machine, the combination with a sheet-drawing mechanism, of a frame that travels toward and away from said sheet-drawing mechanism, a pair of clamps mounted on the upper end of said traveling frame, and a knife mechanism carried by said frame below said clamps and parallel with said clamps, for clamping and severing the sheet of glass.

8. In a glass-making machine, a clamping device consisting of a pair of slidingly-mounted slabs mounted with their adjacent faces parallel to each other, oppositely-placed extending beams secured to said slabs, the arrangement of said beams being such that the adjacent faces of same will be uniformly spaced apart throughout their extent, and means for controlling the distance between said beams and slabs.

9. In a glass-making machine, a clamping mechanism for clamping and holding a sheet of glass, consisting of a pair of slabs mounted parallel to each other, each with extending parallel beams, springs arranged so that said beams will be forced normally inwardly and toward each other, a crank cog-wheel mounted between said pairs of beams, vertically-mounted shafts with cog-wheels thereon meshing with crank cog-wheel, detachable cams secured to said shafts and positioned between said beams, so that when said crank cog-wheel is turned in one direction the clamps are open and when turned in the opposite direction the clamps are closed.

10. In a machine for making glass, a tank for containing the molten glass with an opening in one side thereof, a track beside and parallel with the side of the tank containing said opening, a truck that travels on said track, a gathering-pan, means for gathering molten glass in said pan from the tank and placing it on said truck, and a sheet-drawing mechanism mounted over said track so that the gathering-pan may be moved by said truck under said sheet-drawing mechanism.

11. In a machine for making glass, a tank for containing the molten glass with an opening at one side thereof, a track beside and parallel with the side of the tank containing said opening, a truck that travels on said track, a gathering-pan, means for gathering molten glass in said pan from the tank and placing it on said truck, a sheet-drawing mechanism mounted over said track so that the gathering-pan may be moved by said truck under said sheet-drawing mechanism, another track extending at a right angle to the first-mentioned track and with its end adjacent said sheet-drawing mechanism, a traveling frame on said second track, and clamps and a knife mechanism carried by said frame.

In testimony whereof I have signed my name to this specification in the presence of two subscribing witnesses.

WILLIAM ALLES.

Witnesses:
J. F. CROUCH,
R. E. GOLDSTEIN.